(12) United States Patent
Cheng et al.

(10) Patent No.: US 8,409,881 B2
(45) Date of Patent: Apr. 2, 2013

(54) MULTI-PROJECT WAFER AND METHOD OF MAKING SAME

(75) Inventors: William Cheng, Hsinchu (TW); Mirng-Ji Lii, Sinpu (TW); Chen-Yung Ching, Dali (TW); Hsin-Hui Lee, Kaohsiung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 10 days.

(21) Appl. No.: 12/941,240

(22) Filed: Nov. 8, 2010

(65) Prior Publication Data

US 2011/0049516 A1    Mar. 3, 2011

Related U.S. Application Data

(62) Division of application No. 11/755,461, filed on May 30, 2007, now Pat. No. 7,851,272.

(51) Int. Cl.
*H01L 21/66* (2006.01)

(52) U.S. Cl. .......................................... 438/14

(58) Field of Classification Search .................. 438/14
See application file for complete search history.

(56) References Cited

U.S. PATENT DOCUMENTS

| | | | |
|---|---|---|---|
| 2005/0245005 A1* | 11/2005 | Benson | 438/127 |
| 2005/0273749 A1* | 12/2005 | Kirk | 716/16 |
| 2005/0280434 A1* | 12/2005 | Whetsel | 324/765 |
| 2006/0175697 A1 | 8/2006 | Kurosawa et al. | |
| 2007/0241078 A1* | 10/2007 | Pratt et al. | 216/13 |
| 2008/0012098 A1 | 1/2008 | Chow et al. | |
| 2008/0079125 A1 | 4/2008 | Lu et al. | |

* cited by examiner

*Primary Examiner* — Charles Garber
*Assistant Examiner* — Andre' C Stevenson
(74) *Attorney, Agent, or Firm* — Duane Morris LLP

(57) ABSTRACT

A semiconductor wafer is fabricated. The wafer has a plurality of dies. The plurality of dies include at least operable dies of a first type and operable dies of a second type different from the first type. The dies of the second type are rendered inoperable, while keeping the dies of the first type operable. The wafer is provided with the operable dies of the first type and the inoperable dies of the second type on it, for testing of the dies of the first type.

10 Claims, 5 Drawing Sheets

MULTI-PROJECT WAFER AND METHOD OF MAKING SAME

CROSS-REFERENCE TO RELATED APPLICATION

This is a divisional application of U.S. application Ser. No. 11/755,461 filed May 30, 2007, the entire disclosure of which is incorporated herein by reference.

FIELD OF THE INVENTION

The present invention relates to semiconductor fabrication generally, and more specifically to multi-project wafers (MPW) and methods of fabricating MPW.

BACKGROUND

The Multi Project Wafer (MPW) business model allows fabrication of different devices (or integrated circuits, ICs) on the same wafer using the same set of masks. In an MPW service, different devices might use different designs, different process technologies and/or different numbers of mask layers. MPW allow a semiconductor foundry to divide the costs for wafer and masks among a number of different customers to reduce costs to each customer. MPW are advantageous for advanced Si development such as 90 nanometer, 65 nanometer and 45 nanometer technologies. MPW service allows early engagement of the foundry with the customer for advanced semiconductor development.

In a conventional MPW service, such as the "CYBER-SHUTTLE™" service by Taiwan Semiconductor Manufacturing Co., Ltd. of Hsinchu, Taiwan, a wafer is fabricated containing a plurality of dies of two or more types on behalf of two or more corresponding customers. The wafer is then diced (e.g., using a die saw), and the dies of each type are sorted and delivered to the respective customers.

However, such bare chip delivery can not meet some customers' desire to perform customer-premises performance test and system in package (SIP) development on the wafer.

SUMMARY OF THE INVENTION

In some embodiments, a method comprises the steps of: fabricating a semiconductor wafer having a plurality of dies, the plurality of dies including at least operable dies of a first type and operable dies of a second type different from the first type; rendering the dies of the second type inoperable while keeping the dies of the first type operable; and providing the wafer with the operable dies of the first type and the inoperable dies of the second type thereon, for testing of the dies of the first type.

In some embodiments, a method comprises the steps of: fabricating a semiconductor wafer having a plurality of dies, the plurality of dies including at least operable dies of a first type and operable dies of a second type different from the first type; cutting through or removing a plurality of back-end-of-line layers of the dies of the second type to render the dies of the second type inoperable, while keeping the dies of the first type operable; and providing the wafer with the operable dies of the first type and the inoperable dies of the second type thereon, for testing of the dies of the first type.

In some embodiments, a multi-project wafer has a plurality of operable dies of a first design and a plurality of inoperable dies of a second design different from the first design. The wafer has an unpatterned annular ring at an outer circumference thereof, on a side of said wafer having said dies of the first design and dies of the second design.

DETAILED DESCRIPTION

Figure 1:
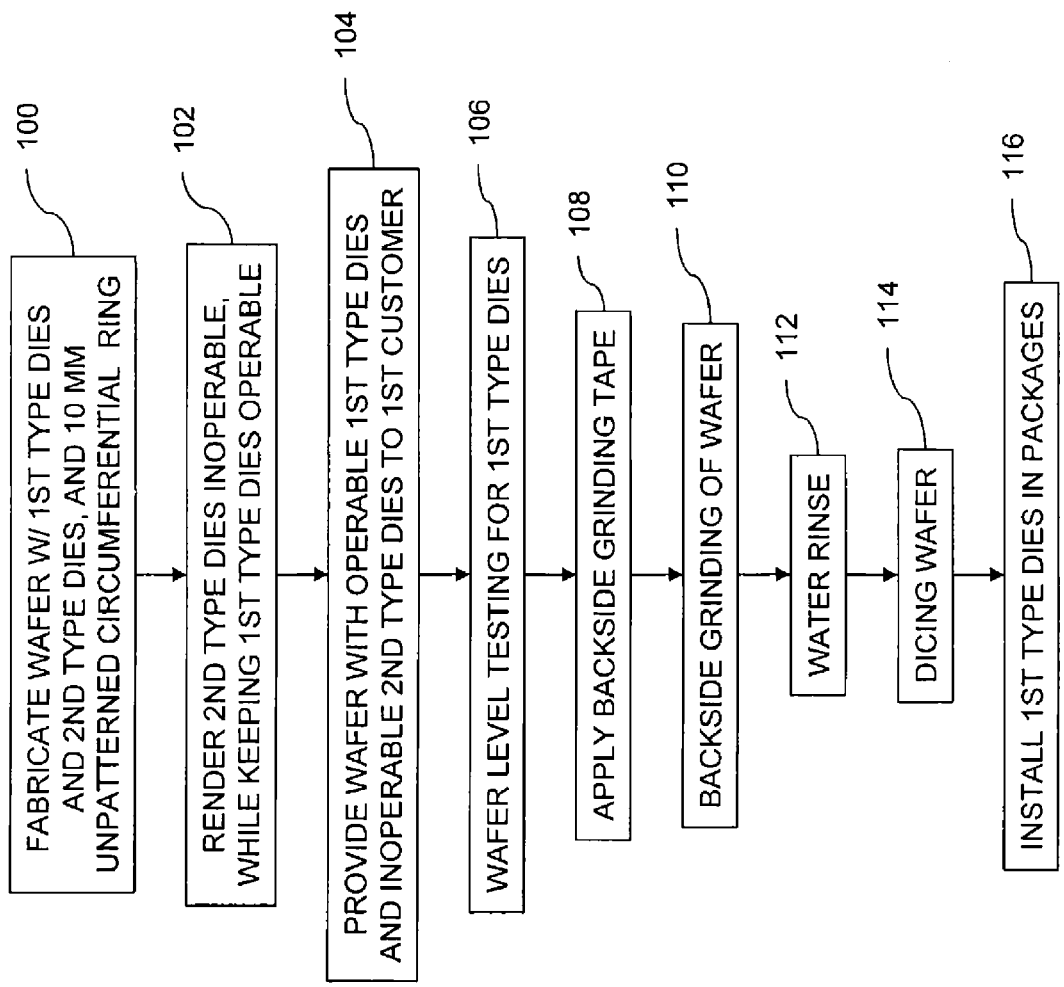
FIG. 1 is a flow chart diagram of an exemplary method for fabricating MPW.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 3:
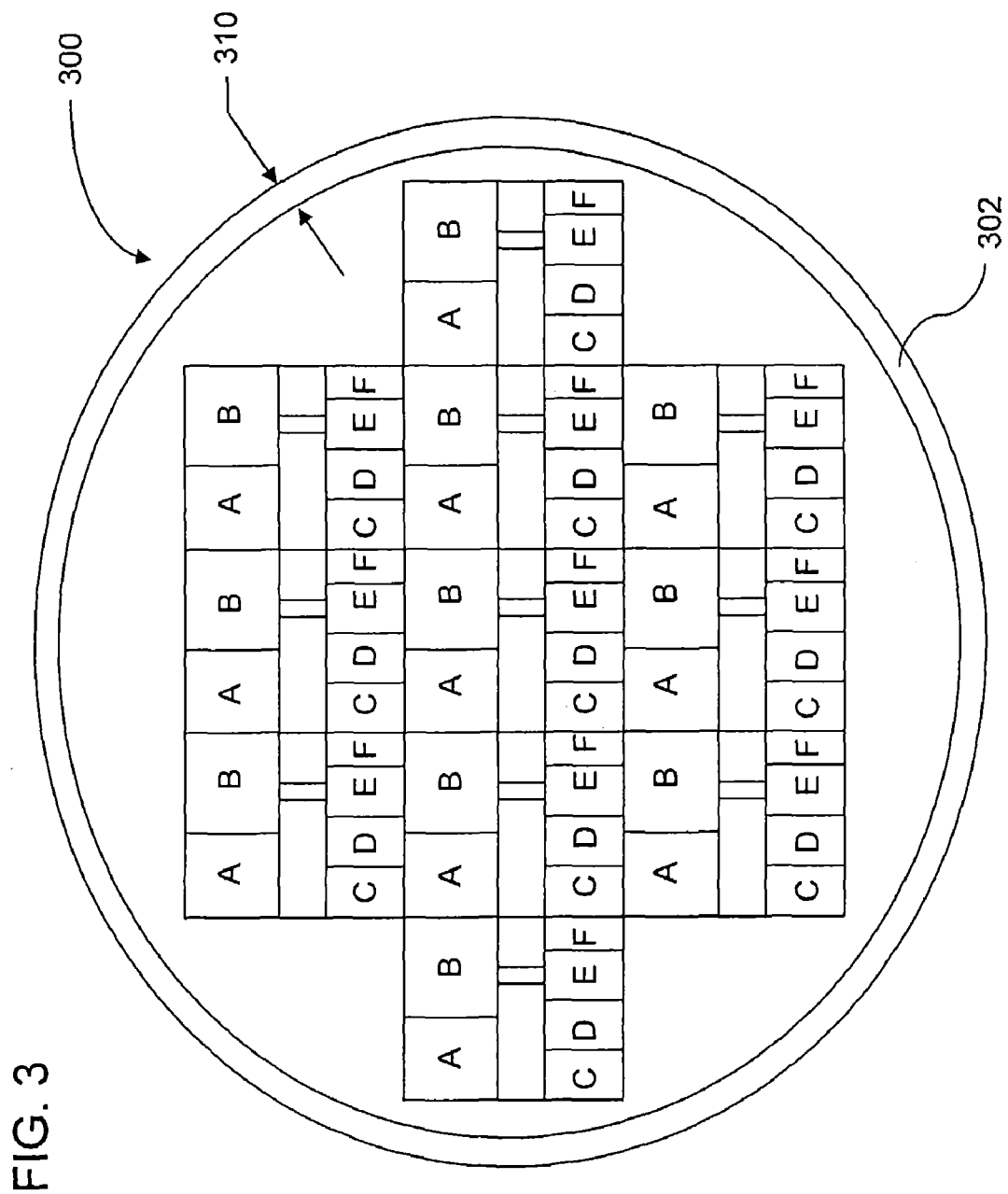
FIG. 3 is a plan view of an MPW.
Figure 4:
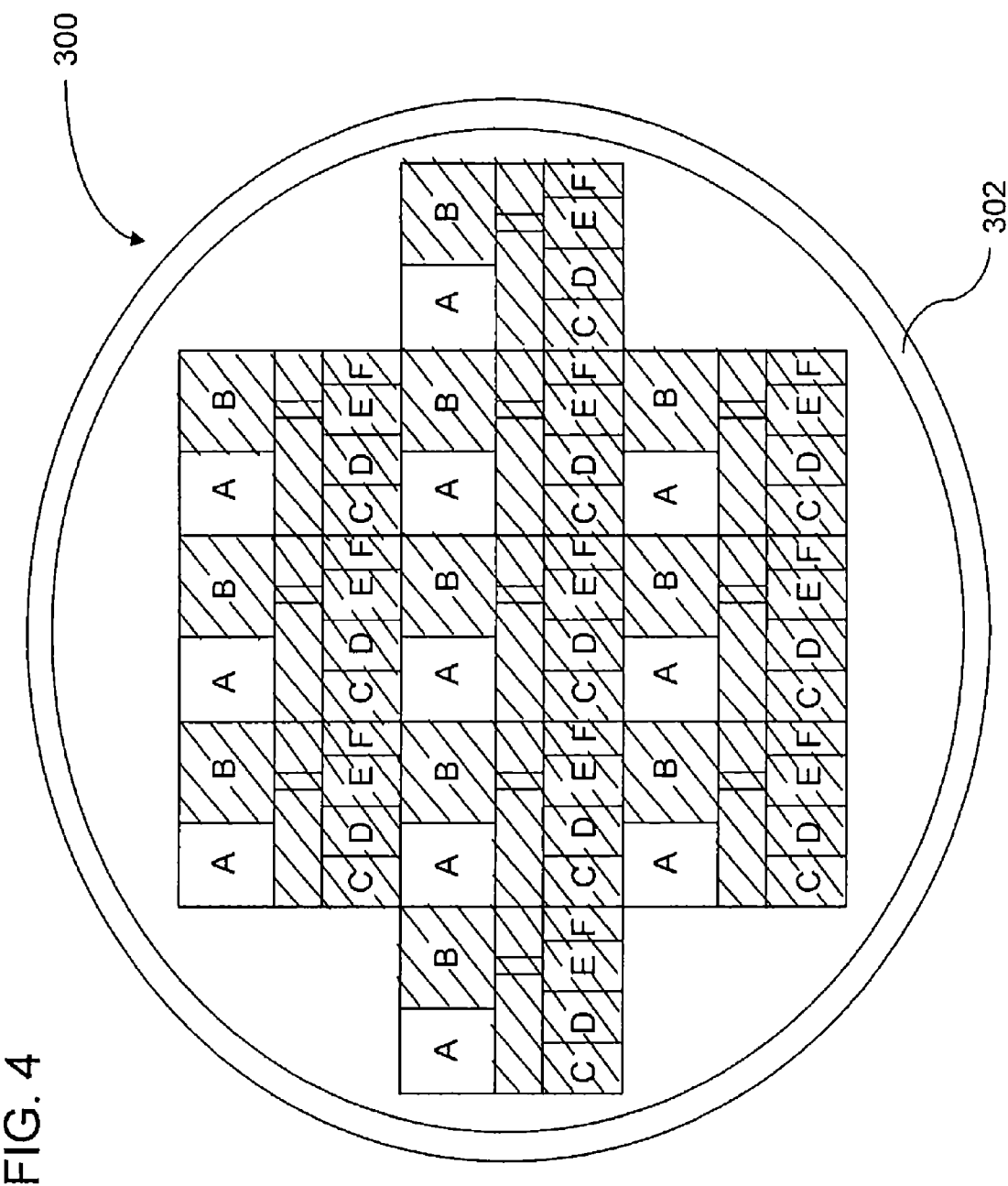
FIG. 4 is a plan view of the MPW of FIG. 3 after the step of rendering dies of the second type inoperable.
Figure 5:
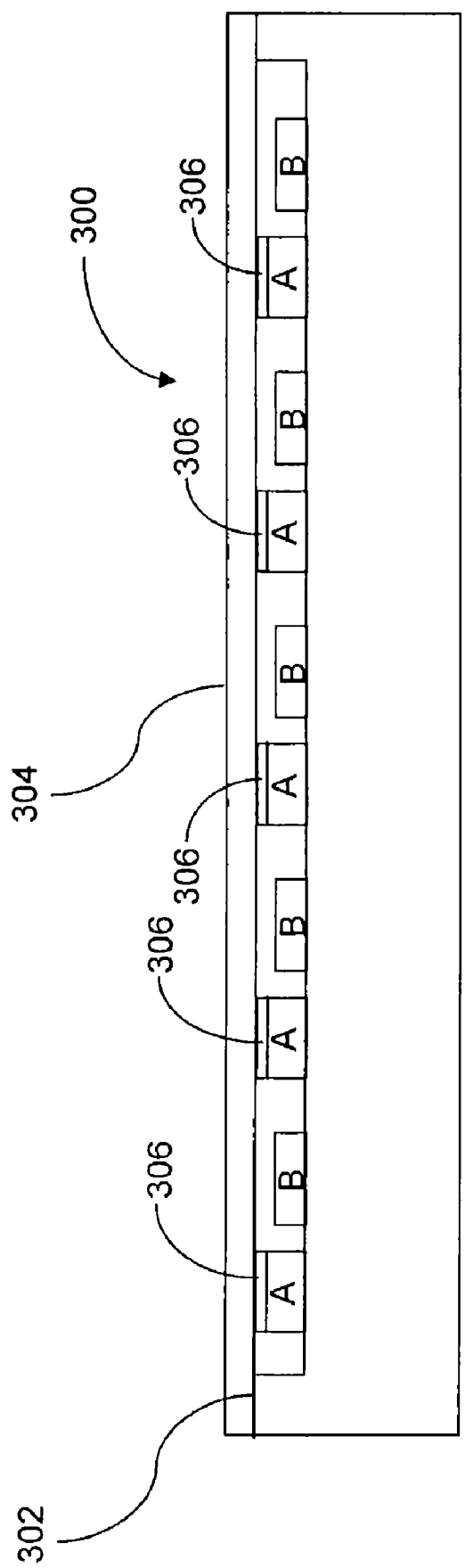
FIG. 5 is a side elevation view of the wafer of FIG. 4.

FIG. 1 is a flow chart of an exemplary method. FIGS. 3-5 show an exemplary wafer produced by the method of FIG. 1.

At step 100 (FIG. 1), a semiconductor multi project wafer 300 (FIG. 3) having a plurality of dies (A, B, C, D and E) is fabricated. The plurality of dies A-E include at least operable dies A of a first type and operable dies B of a second type different from the first type. The various types of dies may be fabricated on behalf of one or more customers. In some embodiments, the first dies A are fabricated according to a design of a first customer, and the second dies B are fabricated according to a design of a second customer different from the first customer.

At step 102, the dies of the second type B are rendered inoperable, while keeping the dies of the first type operable. This step may be performed by a variety of techniques, examples of which are discussed below in the description of FIG. 2. FIG. 4 shows the wafer after the dies of the second type B are rendered inoperable. In FIG. 4, dies B, C, D and E are all shown by cross-hatching, indicating that they are rendered inoperable.

By rendering the dies B of the second type inoperable, the exemplary method allows the use of the MPW service to fabricate a plurality of different IC designs on a single wafer using a single mask set, and permits delivery of the entire wafer to a first one of the customers, while protecting the intellectual property (the design) of the second customer from being observed by the first customer. In some embodiments, electrical paths of the dies of the second type are disturbed, severed, removed, or short circuited. In some embodiments, cuts are made through the back-end-of-line interconnect layers. In some embodiments, the back-end-of-line interconnect layers are removed.

An example is described below in which at least one type of die (second die B) is rendered inoperable. Any number of die types may be rendered inoperable. Preferably, given a die type A fabricated for a first customer, all dies fabricated for the first customer are retained intact and operable; and all dies fabricated for customers other than the first customer are rendered inoperable. However, in other embodiments, another type of die (e.g., die C) fabricated for the first customer may also be rendered inoperable, if the first customer desires a wafer with only one type of operable chip on it.

Referring again to FIGS. 1, 4 and 5, at step 104, the wafer 300 with the operable dies A of the first type and the inoperable dies B of the second type thereon is provided to the first customer for testing of the dies A of the first type.

At step 106 the first customer performs wafer level testing of the dies A of the first type on the wafer 300, before performing a dicing step. In some embodiments, the first customer may omit the wafer level testing step (e.g., if the first customer is only interested in SiP development).

At steps 108-112, in some embodiments, the first customer performs a backside grinding operation, to reduce the thickness of the wafer. For example, the original thickness of wafer 300 may be 31 mils (775 μm), but the first customer may wish to install the die in a package sized for a die of 6-12 mils (150-300 μm). The exemplary method permits the MPW customer to perform backside grinding on the complete wafer. If the first customer intends to install the die in a package that accepts the wafer thickness without grinding, then steps 108-112 may be omitted.

At step 108, a backside grinding (BG) tape 304 is applied over the active side of the wafer 300, as shown in FIG. 5. The BG tape 304 protects the active side of the wafer.

At step 110, the first customer performs backside grinding on the wafer 300.

At step 112, during the grinding step, a water rinsing step is performed to flush the abraded material from the wafer 300, and to cool the wafer and grinding wheel (not shown).

In some embodiments, the wafer 300 has an unpatterned ring 302 on the active face at a circumference of the wafer 300. The ring 302 is free of any of the plurality of dies A-E. The inventors have determined that the application of the rinsing water in the absence of the annular circumferential unpatterned ring 302 can make the grinding force non-uniform. The non-uniform grinding force can cause the wafer 300 to break. On the other hand, inclusion of the annular circumferential unpatterned ring 302 makes the grinding force more uniform during the application of the rinsing water, and reduces breakage of the wafers 300. Without being bound by any particular theory, it is believed that the annular circumferential unpatterned ring 302 improves the sealing action of the BG tape 304, allowing a more uniform pressure to be maintained. In some embodiments, the unpatterned ring 302 has a radial dimension 310 of about 10 millimeters or more.

At step 114, the wafer 300 is diced after the backside grinding step, to obtain individual dies of the first type. If the wafer 300 contains more than one type of die fabricated for the first customer, and all of the dies fabricated for the first customer are kept in the operable condition, then the various types of dies fabricated for the first customer are sorted.

At step 116, the dies of the first type are installed in individual packages by the customer.

Figure 2:
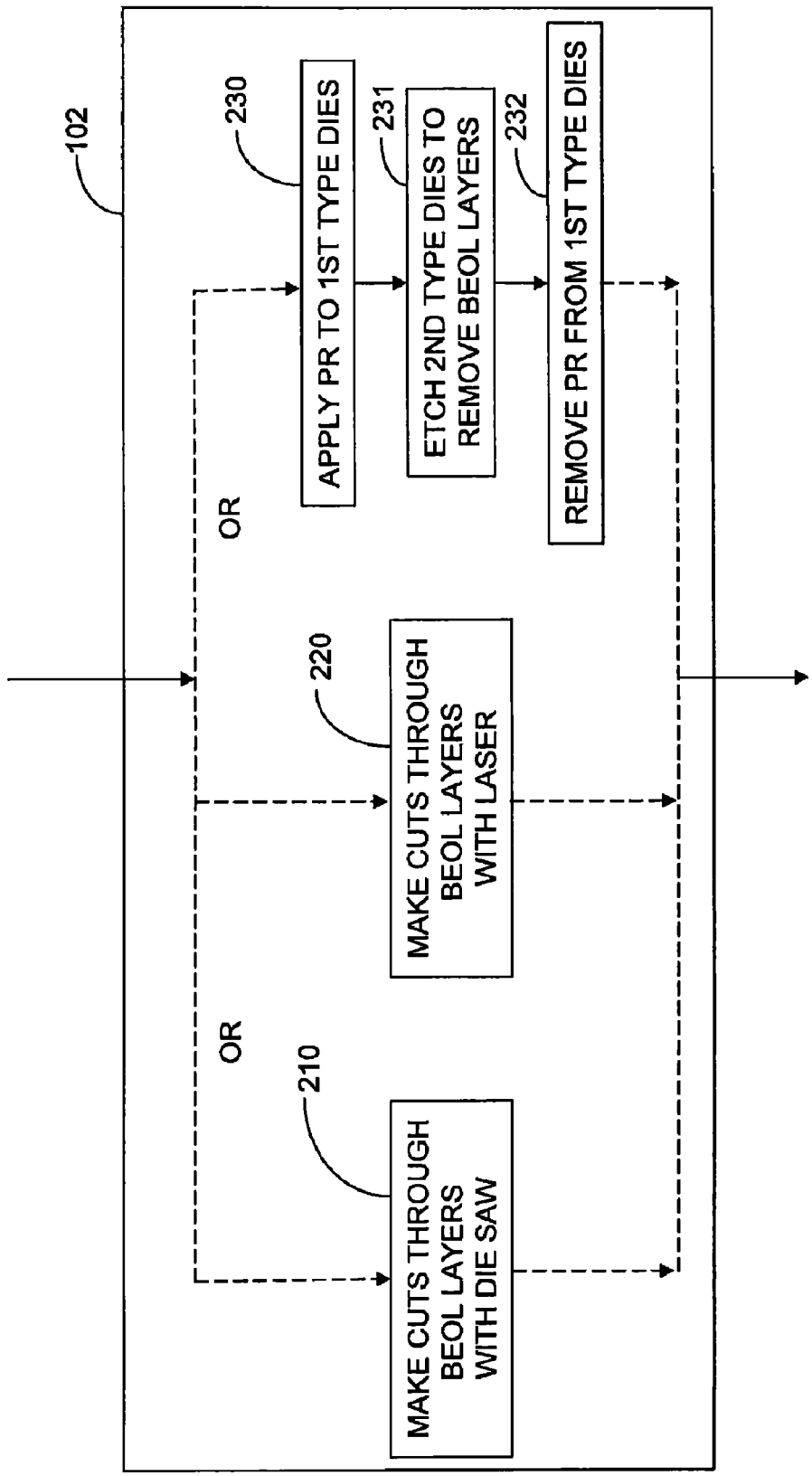
FIG. 2 is a detailed view of the step of rendering dies inoperable, shown in FIG. 1.

FIG. 2 is a flow chart showing step 102 of rendering the dies of the second type inoperable. FIG. 2 shows three alternative methods that may be performed. These three alternative methods are intended to be exemplary, and are not limiting.

FIG. 2 assumes that the dies B of the second type have a plurality of back-end-of-line (BEOL) interconnect layers 306 for making connections between external terminals of the die and the electrodes on the active surface of the die. For example, BEOL layers 306 may include a plurality of dielectric layers with metal layers $M_2$ through $M_T$ and a top passivation layer, and via layers $V_X$ connecting the various metal layers.

At step 210, according to one alternative step, a plurality of cuts may be made at least through the BEOL layers 306 of the dies B of the second type using a die saw (e.g., a diamond coated blade) or other mechanical cutter. In some embodiments, the cuts may optionally extend deeper than the bottom of the BEOL layers 306, and may extend into the surface of the active layer of the substrate. By cutting through all of the BEOL layers 306, the connections between the electrodes on the active layer of the die substrate and the external terminals of the die are severed, destroying the inter-metal dielectric layers of the second customer's dies. In some embodiments, the cuts are made at regular periodic intervals, and are placed sufficiently close together so as to sever major circuit paths throughout the die. In other embodiments, the cuts are made at die-specific locations that are selected to sever all the interconnect paths between the electrodes on the active surface of the substrate and the external terminals with a relatively small (or minimum) number of cuts. In some embodiments, the cuts are so close together that they merge, and the BEOL layers 306 are essentially milled away.

At step 220, in alternative embodiments, the step of making a plurality of cuts at least through the BEOL layers 306 includes using a laser. Examples of suitable lasers include a UV diode laser or a $CO_2$ laser.

At steps 230-232, in some embodiments, the rendering step includes etching at least through the back-end-of-line layers 306 of the dies B of the second type.

At step 230, a protective material, such as a photoresist, is applied over the dies A of the first type before the etching step.

At step 231, a dry (plasma) etch or wet etch is performed to remove the dies B of the second type, without damaging the dies A of the first type, and without removing the annular circumferential unpatterned ring 302. Any plasma or etchant suitable for the substrate and ILD materials of the wafer may be used.

At step 232, the protective material is removed from the dies A of the first type after the etching step.

Other techniques may readily be used by those of ordinary skill in the art to render the dies B of the second type inoperable.

FIGS. 4 and 5 show an example of a multi-project wafer 300, ready for delivery to the first customer.

The wafer 300 can be a silicon substrate, a III-V compound substrate, a silicon/germanium (SiGe) substrate, a silicon-on-insulator (SOI) substrate, for example.

The interconnect layers 306 of the wafer 300 include a plurality of dielectric and metal layers, with vias connecting sequential pairs of metal layers. The dielectric layer may comprise, for example, a silicon carbon nitride (SiCN) layer, a silicon carbon oxide (SCO) layer, an oxide layer, a nitride layer, an oxynitride layer or other dielectric layer that has different etch selectivity with respect to the dielectric layer, or combinations thereof. The dielectric layers may be formed by, for example, a CVD process. The metal layers may comprise copper or aluminum, for example.

The wafer 300 has a plurality of operable dies A of a first design. The wafer 300 has a plurality of inoperable dies B of a second design different from the first design. In the example of FIG. 4, additional dies C, D and E are shown with cross-hatching to indicate that they have also been rendered non-operable. The wafer 300 has an unpatterned annular ring 302 at an outer circumference thereof, on a side of the wafer having the dies A of the first design and dies B of the second design. The unpatterned ring 302 has a radial dimension of about 10 millimeters or more.

In FIG. 4, the cross hatching indicates that the inoperable dies B of the second design either have a plurality of cuts in top surfaces thereof, extending through the back-end-of-line layers 306, or alternatively, the inoperable dies B of the second design have back-end-of-line layers 306 thereof removed therefrom (as specifically shown in FIG. 5).

One of ordinary skill readily understands that using the same mask set, another wafer or set of wafers can be prepared in which the dies B of the second type are retained in operable condition for the second customer, and the remaining dies A, C, D and E are rendered inoperable, to protect the proprietary intellectual property of the first customer and other customers. The second customer can only perform testing on his own dies B.

Additional wafers can be fabricated and prepared for the customers that own the remaining dies C, D and E. In each case, a customer is provided a wafer in which his own dies are operable, and dies according to designs of other customers have been rendered inoperable and/or completely removed.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A multi-project wafer,
   said wafer having a plurality of operable dies of a first design;
   said wafer having a plurality of individual dies of a second design different from the first design, the individual dies of the second design having an active surface with electrodes, external terminals, and interconnect paths extending between the electrodes and the external terminals, wherein the interconnect paths of the individual dies of the second design are mechanically cut resulting in severing the electrical paths of the individual dies of the second design and rendering the individual dies of the second design inoperable.

2. The multi-project wafer of claim 1, wherein the mechanically cut interconnect paths in the individual dies of the second design comprise a plurality of cuts in top surfaces thereof.

3. The multi-project wafer of claim 2, wherein the dies of the second design have back-end-of-line layers, and the plurality of cuts severing through the back-end-of-line layers.

4. The multi-project wafer of claim 3, wherein the plurality of cuts are made at regular periodic intervals, and are placed sufficiently close together so as to sever major circuit paths throughout the dies of the second design.

5. The multi-project wafer of claim 1, wherein said wafer has an unpatterned annular ring at an outer circumference thereof, on a side of said wafer having said dies of the first design and dies of the second design.

6. The multi project wafer of claim 5, wherein the unpatterned annular ring is sized to provide a sealing ring around the circumference of the wafer.

7. A multi-project wafer,
   said wafer having a plurality of operable dies of a first design, the dies of the first design having an active surface with first electrodes, first external terminals, and first interconnect paths that connect the first electrodes and the first external terminals;
   said wafer having a plurality of individual dies of a second design different from the first design, the individual dies of the second design having an active surface with second electrodes, wherein the dies of the second design do not have back end of line interconnect layers, rendering the individual dies of the second design inoperable.

8. The multi-project wafer of claim 7, said wafer having an unpatterned annular ring at an outer circumference thereof, on a side of said wafer having said dies of the first design and dies of the second design.

9. The multi project wafer of claim 8, wherein the unpatterned ring is sized to provide a sealing ring around the circumference of the wafer.

10. The multi-project wafer of claim 8, wherein the unpatterned ring has a radial dimension of about 10 millimeters or more.

* * * * *